United States Patent

Michaud

[15] 3,650,048

[45] Mar. 21, 1972

[54] EXPERIMENTING TABLE WITH FLOATING DISCS

[72] Inventor: Eugéne Michaud, 2410 Chemin Ste Foy, Que., Canada

[22] Filed: Sept. 21, 1970

[21] Appl. No.: 73,864

[52] U.S. Cl. ................................35/19 R, 273/1 E, 273/128 R
[51] Int. Cl. ..............................................G09b 23/10
[58] Field of Search ....................................35/19 R

[56] References Cited

UNITED STATES PATENTS 3,429,544   2/1969   Williams..........................35/19 R UX

FOREIGN PATENTS OR APPLICATIONS 147,797   1962   U.S.S.R.....................................35/19 R

Primary Examiner—Harland S. Skogquist
Attorney—Raymond A. Robic

[57] ABSTRACT

This experimenting device comprises a table, at least one, and preferably two movable plates, such as metallic discs, on the table, means to produce a uniform cushion of air between the table and the plate in order to cause floating of the plate above the surface of the table while having a cushion which is independent of the positions of the plate, and a pulse generator electrically connected with the plate. The plate comprises means to transmit sparks produced by the pulse generator and there are means between the surface of the table and the plate or plates to record the sparks when the plate or plates are in movement.

17 Claims, 6 Drawing Figures

PATENTED MAR 21 1972

INVENTOR
Eugène MICHAUD

BY

ATTORNEY

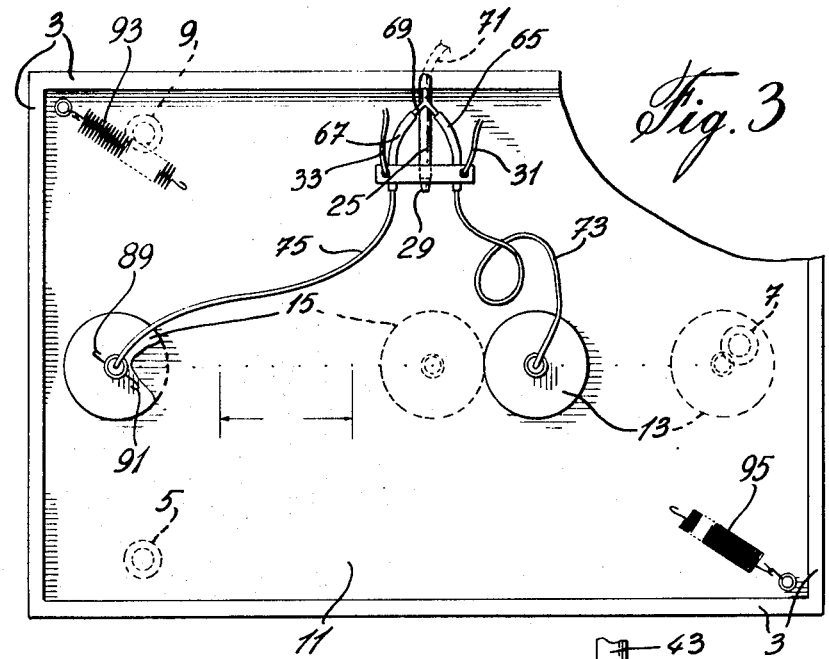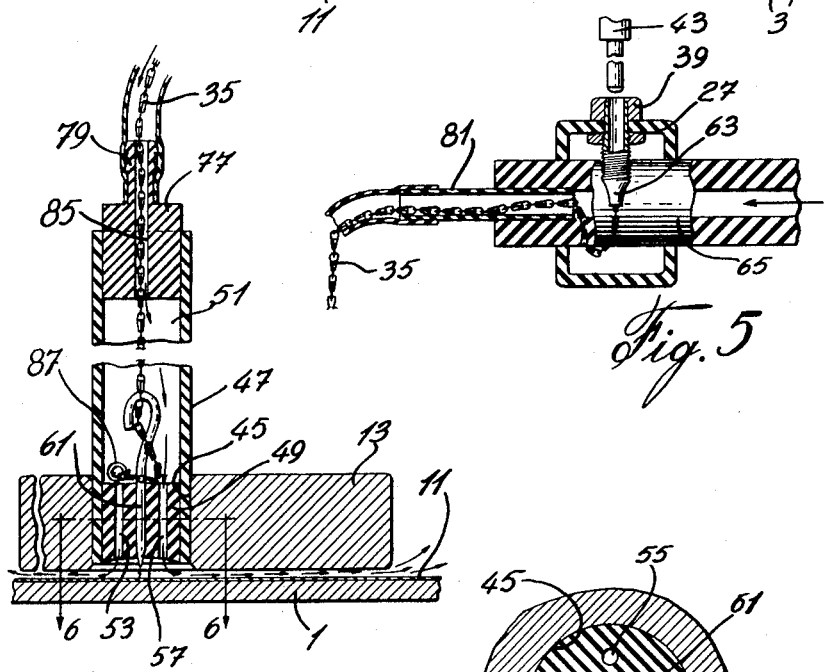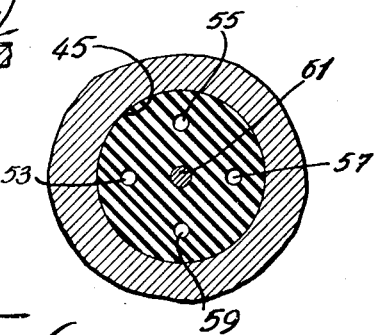

EXPERIMENTING TABLE WITH FLOATING DISCS

BACKGROUND OF THE INVENTION

1. Field of the Invention

This invention relates to an experimenting device. More particularly, the present invention is concerned with an experimentating table with floating discs.

2. Utility for the Study of some Phenomena

The present invention is especially useful for the study of the following phenomena: collision, mechanical oscillation, measurement of "g", gravitation, falling bodies, etc.

Collisions between two articles or bodies in movement involve the following two principles: first, the quantity of movement and second, kinetic energy. Studies of these principles are very important in physics and it would be most desirable to come up with an apparatus which easily enables a person to obtain accurate measurements.

In the past, such articles or bodies in movement were allowed to slide over surfaces in which the coefficients of friction are as low as possible. However, a zero coefficient does not exist when two surfaces are in contact with one another with the result that corrections must always be made when studying collision phenomena between two solid articles or bodies.

The momentum of a body is defined as a vector in which the modulus is equal to the product of the mass of this body times its speed.

It is well established that in any type of collision, the vectorial sum of the momentum before the collision is equal to the vectorial sum of the momentum after the collision, if the system is isolated:

$$\vec{m_1v_1} + \vec{m_2v_2} = \vec{m_1v_1'} + \vec{m_2v_2'}$$

The kinetic energy of a body is defined by the formula ½ mv$^2$ and it is a scalar quantity.

It would appear very desirable to come up with an apparatus which can easily and accurately measure the above values.

3. Description of Other Air Tables Commercially Available

At present, two air tables are commercially available: the Ealing Table and the Linco Table. Both tables use the same principle which is a perforated surface through which air is blown from underneath to create a cushion of air for the movable discs. To measure the speed of the discs when the latter move over the cushion of air, a camera is used to take pictures of the moving discs. The speed can then very easily be computed by measuring the displacements at regular time intervals. The Linco Table is essentially similar to the Ealing Table and both make use of a stroboscope and camera.

Basically the above apparatuses are too expensive mainly because they must be used in association with a stroboscope and camera. Furthermore, utilizing a camera and low weights are definite causes of error in determining the speed of the discs.

To decrease the cost and the possibility of error it would appear logical to place a sheet of marking paper over the surface of the table and utilizing heavier weights. However, this is impossible since the surface is perforated.

Finally, the weights which can be used are necessarily small because the air cushion is not strong enough by surface units.

Since the students wish very precise and easily attained results, it would appear that the above air tables are not completely satisfactory.

In order to overcome the above disadvantages, this experimenting device was invented.

SUMMARY OF THE PRESENT INVENTION

This experimenting device comprises a table, at least one movable plate on the table, means to produce a uniform cushion of air between the table and the plate, in order to cause floating of the plate above the surface of the table while having a cushion which is independent of the positions of the plate and a pulse generator electrically connected with the plate. The plate comprises means to transmit sparks produced by the pulse generator and there are means between the surface of the table and the plate or plates to record the sparks when the plate is in movement.

It is understood that the discs may be metallic, such as steel, and can be elastic or non elastic.

BRIEF DESCRIPTION OF THE DRAWINGS

In the drawings which illustrate the invention,

FIG. 3 is a view from above showing a collision between two metallic discs;

FIG. 4 is a section through one of the discs and its sparking mechanism;

FIG. 5 illustrates in section the connection between the electrical cable, the air inlet and the rubber tube including a conductor chain; and FIG. 6 is a section through line 6—6 of FIG. 4.

DESCRIPTION OF THE PREFERRED EMBODIMENT

Figure 1:
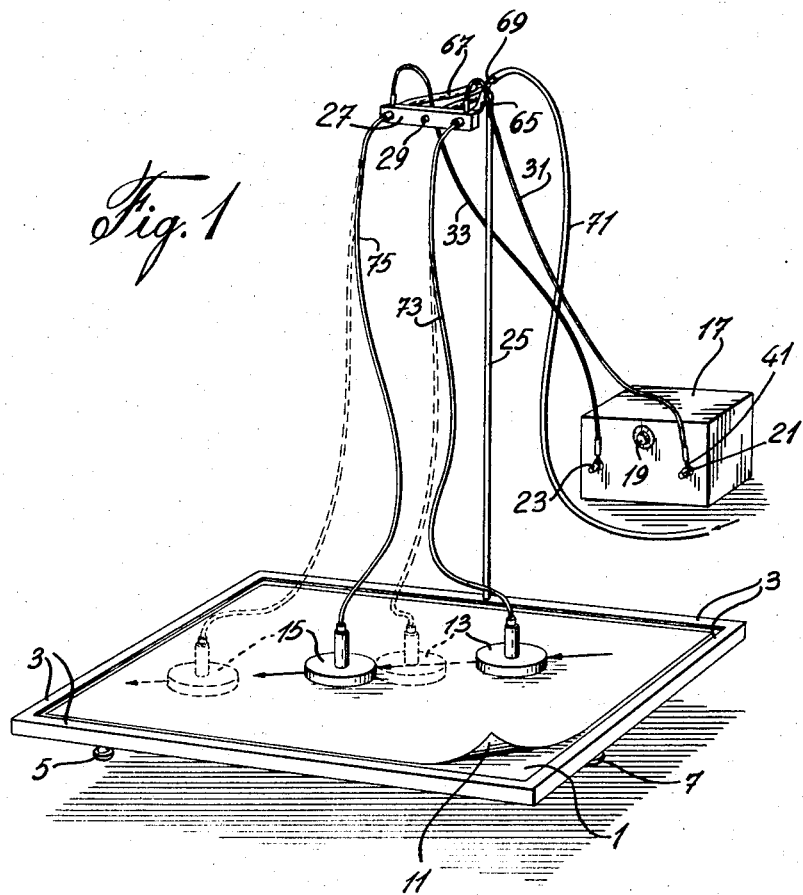
FIG. 1 is a perspective view of the device according to the invention.

With reference to the drawings, the device illustrated comprises a table 1 having a peripheral edge 3. To serve its purpose, the table 1 must be perfectly leveled and to achieve this, there are provided three level adjusting legs 5, 7 and 9 underneath table 1. The legs 5, 7 and 9 are of a type that can be screwed in or out and are sufficiently known without having to describe them in detail. In any case, they are not an essential part of the invention.

Over the surface of the table 1 there is disposed a recording paper 11 which will be discussed more in detail hereinafter when explaining the operation of the device.

Next, there are two metallic discs 13, 15 which are placed on the table 1 over the recording paper 11. The device according to the invention finally comprises a pulse generator 17 of a known type which produces a fixed number of sparks per second (e.g., 60, 30 etc.). The pulse generator 17 has a control knob 19 and two electrical connections 21, 23.

The table 1 also comprises an L-shaped stand 25 which is fixedly mounted over one of the longer edge 3, preferably in the manner illustrated in FIG. 1 of the drawings. A hollow insulated support 27 (see FIG. 5) provided with suitable openings as will be seen later on and evidenced from the drawings is mounted at the free end 29 of the stand 25 and this is accomplished by inserting the free end 29 through central openings of the support 27. Reference is made to FIG. 1 and 3.

Figure 2:
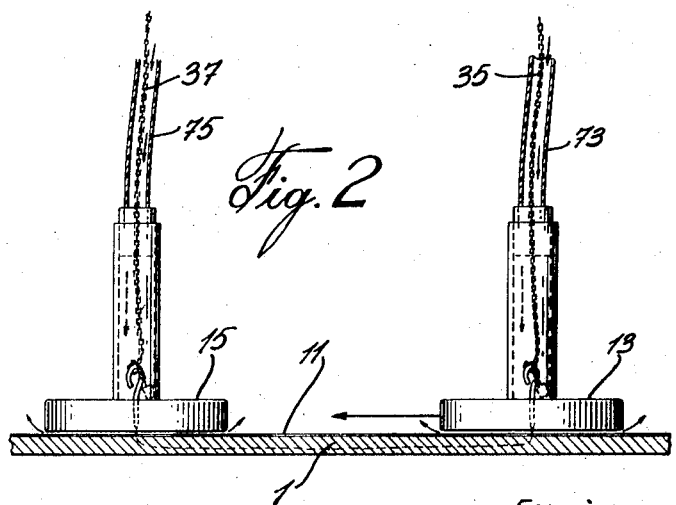
FIG. 2 is a side view partly in section showing two discs floating on a cushion of air above the surface of the table.

The electrical connections between the pulse generator 17 and the discs 13 and 15 are made respectively by means of electrical cables 31 and 33 and conductor chains 35 and 37 (FIG. 2). The electrical cables 31, 33 are respectively connected to conductor chains 35, 37 inside the support 27 and one of these connections will now be described with reference to FIG. 5 of the drawings.

On the upper face of the support 27 there is a jack socket 39 which is of the type illustrated in the drawings. The electrical cable 31 has an eyelet connection 41 at one end thereof for connecting said cable 31 at 21 on the pulse generator 17. The other end of the electrical cable 31 is formed with a jack 43 and the latter is intended to be received in the jack socket 39 all as illustrated in FIG. 5 of the drawings, when the device is in operation.

Before going back to the conductor chains 35, 37 (FIG. 2) let us turn to one disc 13 in order to describe it in detail (FIG. 4), it being understood that the other disc 15 is quite similar to disc 13, and that like parts will be given like reference numerals.

With reference to FIG. 4, the disc 13 will be seen to be formed with an annular central cavity 45 into which there is inserted a plug 47. The plug 47 comprises a lower solid portion 49 and an upper hollow portion 51. The lower solid portion 49 of the plug 47 comprises air holes 53, 55, 57 and 59 which extend all through the solid portion 49 and are arranged in the manner illustrated in FIG. 6 of the drawings. These air holes will allow the passage of enough air to produce a cushion of air between the underface of the disc 13 and the surface of the table 1. The plug 47 also comprises a sparking pin 61 which projects slightly from the underface of the plug 47. Reference is made to FIG. 6 wherein it will be realized that the underface of the plug 47 is concave and that further, it terminates short of the lower face of the disc 13. This will serve to leave a projecting end of the sparking pin 61 without the latter getting in contact with the recording paper 11.

As illustrated, the upper end of the sparking pin 61 is formed as a hook which occupies a certain space inside the hollow portion 51. The conductor chain 35 is welded at one end to the tip 63 of the jack socket 39 and at the other end it will be allowed to move freely inside the hollow portion 51 while always remaining in contact with the hook portion of the sparking pin 61. Of course, contact between the sparking pin 61 and the conductor chain 35 can be made by any other known means, however, it has been found that the one just described is more convenient.

As stated above, it is essential that the discs 13, 15 move over a cushion of air in order to carry out studies of the collision phenomena between the two discs. The arrangement which is used to produce the air cushion will now be described. A curve plastic tube 65 and 67 connected to a Y-connection 69 is mounted on and extends through the support 27 in the particular manner illustrated in FIGS. 1 and 5 of the drawings. Plastic tube 65 and 67 is connected via the Y-connection 69 to a tube 71 which is used to blow air into the tubes 65 and 67 either by merely blowing air with the mouth or by using an air compressor not shown. For each disc 13, 15 there is a respective rubber tube 73, 75 which connects the plugs 47 and the plastic tube 65, 67. It will be seen that in this manner there is a free passage of air from the entry of the tube 71, via plastic tubes 65, 67 rubber tubes 73, 75 plugs 47, air holes 53, 55, 57, 59 to the under face of the discs 13, 15.

At the upper end of the hollow portion 51 of the plug 47, there is a plug 77 which is terminated by a threaded portion 79 over which one end of the rubber tube 73, 75 can be tightly engaged. Similarly, to mount the other end of the rubber tube 73, 75 in the plastic tube 65, 67, there is a connector 81 as best illustrated in FIG. 5 of the drawing. Both the plug 77 and the connector 81 are provided with suitable axial passages 83 and 85 respectively to permit the passage of the conductor chain 47 therethrough and through the rubber tube 65, 67. It will be noted that the end of the conductor chain 35 inside the hollow portion 51 is attached to a small ring 87 to assure an electric contact between the chain and the hook of the pin.

Collisions can be produced in the particular manner illustrated in FIG. 3 of the drawings. Knowing that the space between two dots produced by the sparks corresponds to a known fraction of a second the velocity of the colliding discs can easily be computed.

It is also possible to study the elasticity of two tension springs for example by arranging hooks 89 and 91 on the disc 15 and hooking tension spring 93 and 95 respectively to hooks 89 and 91. Here again values of kinetic and potential energy as well as the speed and path can be computed on the basis of the distance between two dots which is 1/60th of a second or some known fraction of a second.

The table of the present invention is preferably used with a cushion of air in which the pressure is about 3 to 5 pounds.

I claim:
1. An experimenting device which comprises:
a. a table;
b. at least one movable plate on said table;
c. means to produce a uniform cushion of air between said table and said plate in order to cause floating of said plate above the surface of said table said cushion being uniform and independent of the position of said plate;
d. a pulse generator electrically connected with said plate through said table;
e. means in said plate to transmit sparks produced by said pulse generator; and
f. means between the surface of said table and said plate to record said sparks when said plate is in movement.

2. An experimenting device according to claim 1, wherein said plate is a metallic disc.

3. An experimenting device according to claim 2, wherein said metallic disc is made of steel.

4. An experimenting device according to claim 1, wherein said plate is an elastic disc.

5. An experimenting device according to claim 1, wherein said plate is a nonelastic disc.

6. An experimenting device according to claim 1, wherein said plate is in the form of a disc.

7. An experimenting device according to claim 6, which comprises two discs.

8. An experimenting device according to claim 1, which comprises means for leveling said table.

9. An experimenting device according to claim 8, wherein said leveling means comprise three level adjusting legs mounted underneath said table.

10. An experimenting device according to claim 6, wherein said disc is formed with an annular central cavity, a plug is mounted in said cavity, said plug comprising a sparking pin which projects from the underface of said plug, said plug terminating short of the lower face of said disc to leave a space between the lower end of said sparking pin and the lower face of said disc, said plug formed with air holes to allow the passage of air which produces said cushion of air.

11. An experimenting device according to claim 10, wherein the upper end of said sparking pin is connected to said pulse generator via a conductor chain which connects the upper end of said sparking pin to an electrical cable connected to said pulse generator.

12. An experimenting device according to claim 11, which comprises a rubber tube to conduct air and enclose said conductor chain.

13. An experimenting device according to claim 12, wherein said means to record said sparks comprises a sheet of marking paper placed between the surface of said table and said discs.

14. An experimenting device according to claim 13, wherein said marking paper is carbon paper.

15. An experimenting device according to claim 13, wherein said marking paper is color wax paper.

16. An experimenting device according to claim 13, wherein said means to produce a cushion of air comprises an air compressor which is adapted to produce an air flow through said rubber tube and said air holes.

17. An experimenting device according to claim 16, which comprises two discs each said discs is connected to said pulse generator via its own sparking pin through conductor chain and electrical cable and to said air compressor through its own rubber tube.

* * * * *